United States Patent
Liu et al.

(10) Patent No.: US 10,739,888 B2
(45) Date of Patent: Aug. 11, 2020

(54) TOUCH DISPLAY PANEL AND TOUCH DISPLAY DEVICE THEREOF

(71) Applicant: XIAMEN TIANMA MICRO-ELECTRONICS CO., LTD., Xiamen (CN)

(72) Inventors: Bingping Liu, Xiamen (CN); Xiai Xu, Xiamen (CN); Min Huang, Xiamen (CN); Qiangcan Huang, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 19 days.

(21) Appl. No.: 16/112,137

(22) Filed: Aug. 24, 2018

(65) Prior Publication Data

US 2019/0064979 A1 Feb. 28, 2019

(30) Foreign Application Priority Data

Aug. 28, 2017 (CN) .......................... 2017 1 0752615

(51) Int. Cl.
| | |
|---|---|
| G06F 3/041 | (2006.01) |
| G06F 3/047 | (2006.01) |
| G09G 3/20 | (2006.01) |
| G06F 3/044 | (2006.01) |
| G02F 1/1333 | (2006.01) |
| H04M 1/03 | (2006.01) |

(52) U.S. Cl.
CPC ............ *G06F 3/0412* (2013.01); *G06F 3/047* (2013.01); *G06F 3/0416* (2013.01); *G09G 3/20* (2013.01); *G02F 1/13338* (2013.01); *G02F 2201/121* (2013.01); *G02F 2201/123* (2013.01); *G06F 3/044* (2013.01); *G09G 2310/0264* (2013.01); *H04M 1/03* (2013.01)

(58) Field of Classification Search
CPC .................................................. G06F 3/04164
See application file for complete search history.

(56) References Cited

U.S. PATENT DOCUMENTS

2008/0174535 A1* 7/2008 Yoon ....................... H01L 24/06
345/90
2018/0329544 A1* 11/2018 Yeh ........................ G06F 3/0418

FOREIGN PATENT DOCUMENTS

| CN | 100433083 C | 11/2008 |
|---|---|---|
| CN | 101452126 B | 6/2012 |

(Continued)

*Primary Examiner* — Sepehr Azari
(74) *Attorney, Agent, or Firm* — Anova Law Group PLLC

(57) ABSTRACT

A touch display panel and a display device are provided. The touch display panel includes a display region and a non-display region. The display region includes a plurality of pixel electrodes and a plurality of touch control electrodes, and the non-display region includes a fan-out region and a bonding region used to bond a driving circuit. The bonding region includes a plurality of first pads and a plurality of second pads. A first pad is electrically connected to a signal output terminal of the driving circuit. A second pad is electrically connected to a signal input terminal of the driving circuit. The fan-out region includes a plurality of first trace wires electrically connected to the plurality of pixel electrodes as well as the plurality of first pads, and a plurality of second trace wires electrically connected to the touch control electrodes as well as the plurality of second pads.

15 Claims, 10 Drawing Sheets

(56) References Cited

FOREIGN PATENT DOCUMENTS

| CN | 103309107 A | 9/2013 |
| CN | 104914606 A | 9/2015 |
| CN | 105653087 A | 6/2016 |
| CN | 106200161 A | 12/2016 |
| CN | 106773389 A | 5/2017 |
| KR | 20150022211 A | 3/2015 |

\* cited by examiner 1041 1042

600

TOUCH DISPLAY PANEL AND TOUCH DISPLAY DEVICE THEREOF

CROSS-REFERENCES TO RELATED APPLICATIONS

This application claims the priority of Chinese patent application No. 201710752615.3, filed on Aug. 28, 2017, the entirety of which is incorporated herein by reference.

FIELD OF THE DISCLOSURE

The present disclosure generally relates to the field of display technology and, more particularly, relates to a touch display panel and a touch display device thereof.

BACKGROUND

The liquid crystal display is a commonly used flat panel display, and the thin film transistor liquid crystal display (TFT-LCD) is currently the mainstream product in liquid crystal displays. With the increasingly fierce competition in TFT-LCD products, manufacturers have adopted new technologies to reduce the cost of products and improve the market competitiveness of products.

Touch technology has been developed rapidly in recent years, and many kinds of touch technologies have been put into mass production. In recent years, based on the consideration of higher integration, the touch driving module and the LCD driving module have been integrated into a same integrated circuit (IC) chip, which can not only reduce the space occupied by bonding, but also further reduce cost. The IC can narrow the border-bottom by a COG (chip on glass) technology or a COF (chip on film) technology.

However, in a current panel using the COG technology, the border-bottom is often substantially wide. The disclosed touch display panel and display device are directed to solve one or more problems set forth above and other problems.

BRIEF SUMMARY OF THE DISCLOSURE

One aspect of the present disclosure includes a touch display panel. The touch display panel includes a display region and a non-display region. The display region includes a plurality of pixel electrodes and a plurality of touch control electrodes, and the non-display region includes a fan-out region and a bonding region used to bond a driving circuit. The bonding region includes a plurality of first pads and a plurality of second pads. A first pad of the plurality of first pads is electrically connected to one of signal output terminals of the driving circuit for providing a data signal to a pixel electrode of the plurality of pixel electrodes. A second pad of the plurality of second pads is electrically connected to one of signal input terminals of the driving circuit for one or more of receiving a touch control signal collected by the touch control electrodes and providing the touch control signal to the touch control electrodes. The fan-out region includes a plurality of first trace wires electrically connected to the plurality of pixel electrodes as well as the plurality of first pads, and a plurality of second trace wires electrically connected to the plurality of touch control electrodes as well as the plurality of second pads.

Another aspect of the present disclosure includes a touch display device including a touch display panel. The touch display panel includes a display region and a non-display region. The display region includes a plurality of pixel electrodes and a plurality of touch control electrodes, and the non-display region includes a fan-out region and a bonding region used to bond a driving circuit. The bonding region includes a plurality of first pads and a plurality of second pads. A first pad of the plurality of first pads is electrically connected to one of signal output terminals of the driving circuit for providing a data signal to a pixel electrode of the plurality of pixel electrodes. A second pad of the plurality of second pads is electrically connected to one of signal input terminals of the driving circuit for one or more of receiving a touch control signal collected by the touch control electrodes and providing the touch control signal to the touch control electrodes. The fan-out region includes a plurality of first trace wires electrically connected to the plurality of pixel electrodes as well as the plurality of first pads, and a plurality of second trace wires electrically connected to the plurality of touch control electrodes as well as the plurality of second pads.

Other aspects of the present disclosure can be understood by those skilled in the art in light of the description, the claims, and the drawings of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

It should be noted that the embodiments in the present disclosure and the features in the embodiments can be combined with each other without conflict. The present application will be described in detail below with reference to the drawings and in combination with the embodiments.

Figure 1A:
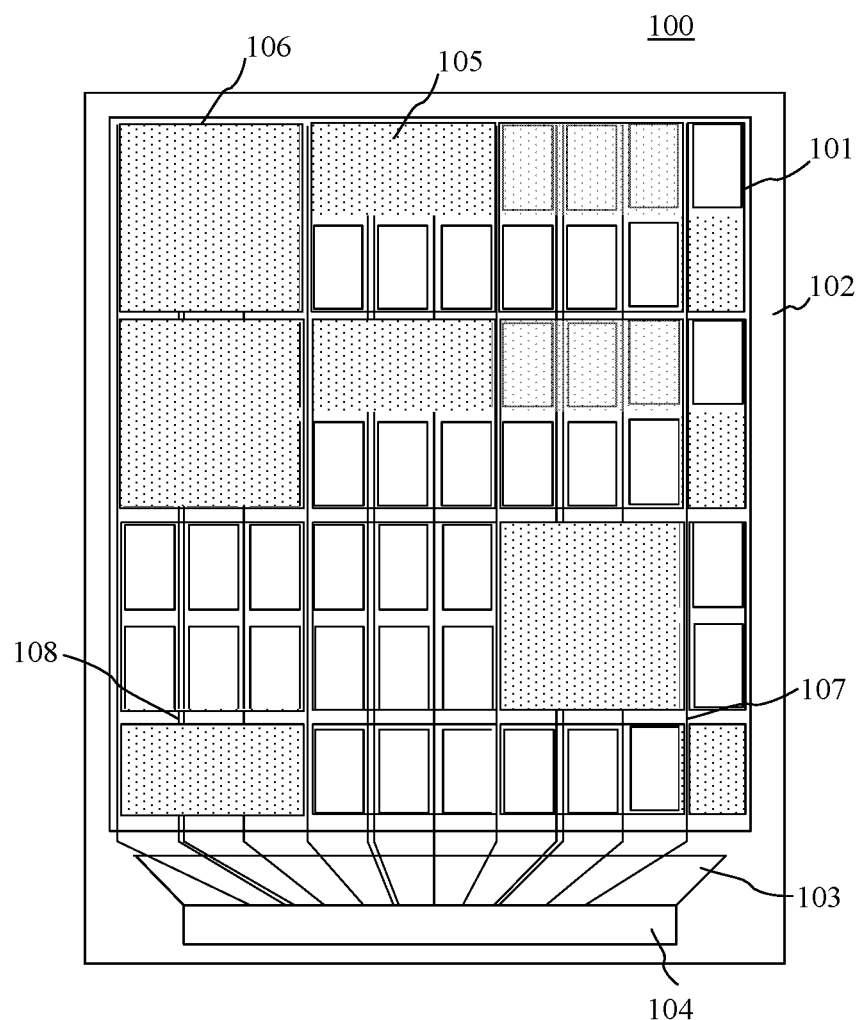
FIG. 1A illustrates a schematic diagram of an exemplary touch display panel consistent with disclosed embodiments of the present disclosure.
Figure 1B:
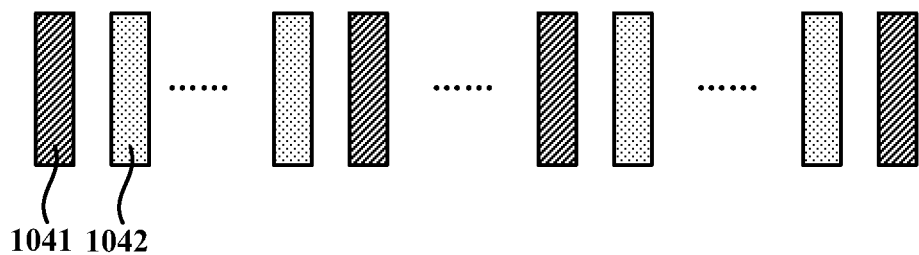
FIG. 1B illustrates a schematic diagram of a bonding region of an exemplary touch display panel illustrated in FIG. 1A consistent with disclosed embodiments of the present disclosure.

FIG. 1A illustrates a schematic diagram of an exemplary touch display panel consistent with disclosed embodiments of the present disclosure; and FIG. 1B illustrates a schematic diagram of a bonding region of the touch display panel illustrated in FIG. 1A. In one embodiment, referring to FIG. 1A and FIG. 1B, a touch display panel 100 may include a display region 101 and a non-display region 102. The display region 101 may include a plurality of pixel electrodes 105 and touch control electrodes 106. The non-display region 102 may include a fan-out region 103 and a bonding region 104. The pixel electrodes 105 may be used to display a picture under the action of data signals, and the touch control electrodes 106 may be used to detect a touch position under the action of touch driving signals. The above bonding region 104 may be used to bond a driving circuit. The bonding region 104 may include a plurality of first pads and a plurality of second pads.

In one embodiment, a first pad may be electrically connected to one of signal output terminals of the driving circuit for supplying a data signal to a pixel electrode 105 in the display region 101. A second pad may be electrically connected to one of signal input terminals of the driving circuit for receiving a touch control signal collected by the touch control electrodes 106 and/or providing a touch control signal to the touch control electrodes 106. It can be understood that, when the touch display panel 100 is a mutual-capacitive touch display panel, the signal input terminal may be used to transmit a touch sensing signal collected by the touch control electrodes 106 to the driving circuit or transmit the touch control signal to the touch control electrodes 106. When the touch display panel 100 is a self-capacitive touch display panel, the signal input terminal may not only transmit the touch sensing signal collected by the touch control electrodes 106 to the driving circuit, but also transmit the touch driving signals to the touch control electrodes 106.

In one embodiment, the pixel electrode 105 may be electrically connected to a data line 107. The data line 107 may extend from the display region 101 to the fan-out region 103 and the bonding region 104, and may be electrically connected to a corresponding pad in the bonding region 104. The control electrode 106 may be electrically connected to a touch control signal line 108. The touch control signal line 108 may extend from the display region 101 to the fan-out region 103 and the bonding region 104, and may be electrically connected to a corresponding pad in the bonding region 104.

The fan-out region 103 may include a plurality of first trace wires electrically connected to the pixel electrodes and the first pads, and a plurality of second trace wires electrically connected to the touch control electrodes and the second pads. The first trace wire may transmit the data signal outputted from the driving circuit to the pixel electrode. The second trace wire may transmit the touch control signal outputted from the driving circuit to the touch control electrodes, or may also transmit the touch sensing signal generated by the touch control electrodes to the driving circuit.

In one embodiment, the bonding region 104 may include at least four first pads, and one side of each first pad of the four first pads may be arranged adjacent to the second pad. The bonding region 104 may at least include four first pads 1041, and one side of each first pad may be arranged adjacent to a second pad 1042. Therefore, correspondingly, the fan-out region of the touch display panel may have a shape as illustrated in FIG. 1C.

Figure 1C:
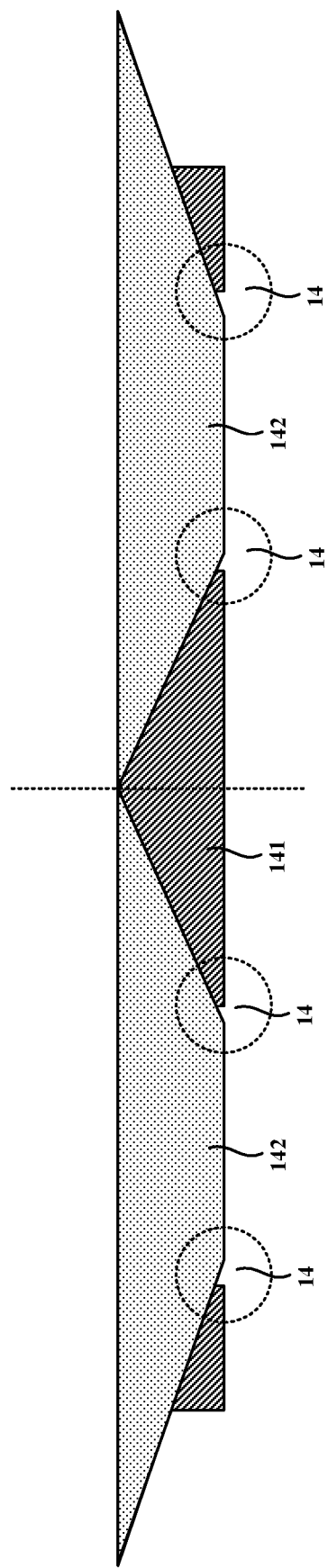
FIG. 1C illustrates a schematic diagram of a bonding region of another exemplary touch display panel consistent with disclosed embodiments of the present disclosure.

In particular, a data line fan-out region 141 corresponding to the first pad 1041 and a touch control signal line fan-out region 142 corresponding to the second pad 1042 may have a shape and a relative position as illustrated in FIG. 1C. In view of this, at each adjacent location between the data line fan-out region 141 and the touch control signal line fan-out region 142, the first pad 1041 may be arranged adjacent to the second pad 1042. Accordingly, the bonding region of the touch display panel may include four first pads 1041 arranged adjacent to the second pad 1042. In view of this, a tilt angle between the data line and the touch control signal line in the fan-out region may be reduced, such that under the premise of ensuring a safe spacing between adjacent trace wires (e.g., adjacent data lines, or adjacent touch control signal lines), a height of the fan-out region may be further compressed, which may facilitate further narrowing of the border-bottom of the touch display panel.

Figure 2A:
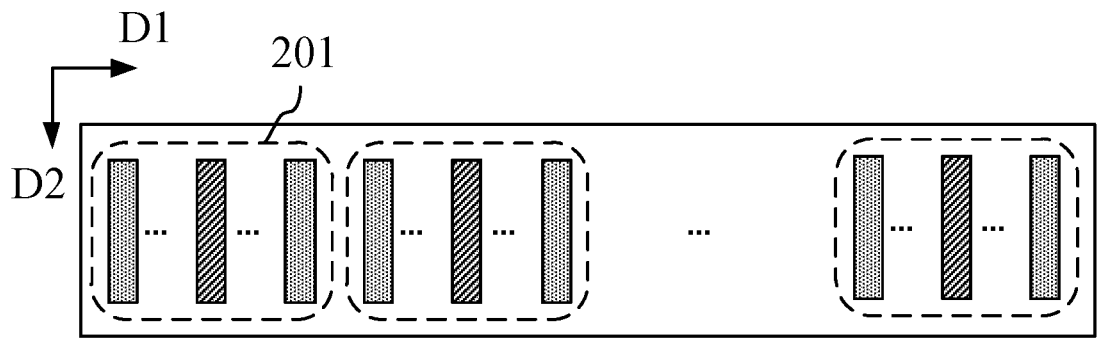
FIG. 2A illustrates a schematic diagram of a bonding region of another exemplary touch display panel consistent with disclosed embodiments of the present disclosure.
Figure 2B:
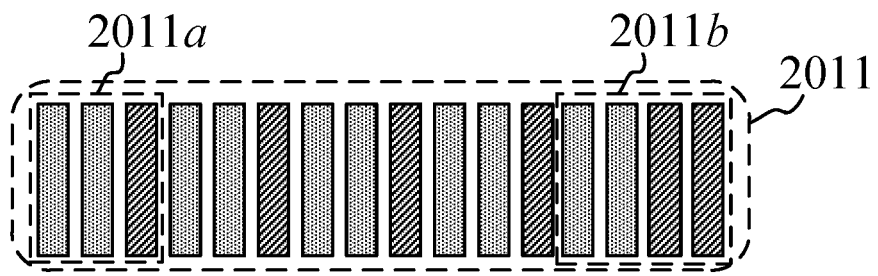
FIG. 2B illustrates a schematic diagram of an arrangement of a first pad group of an exemplary touch display panel consistent with disclosed embodiments of the present disclosure.
Figure 2C:
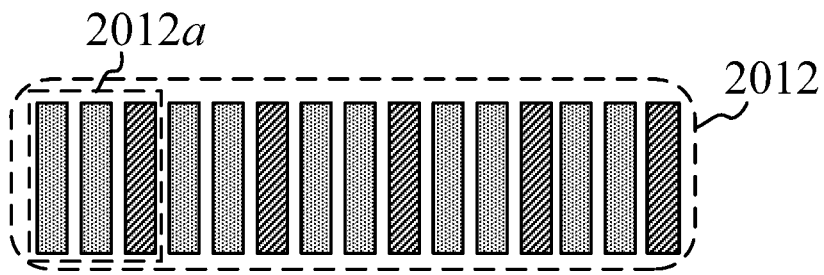
FIG. 2C illustrates a schematic diagram of another arrangement of a first pad group of an exemplary touch display panel consistent with disclosed embodiments of the present disclosure.
Figure 2D:
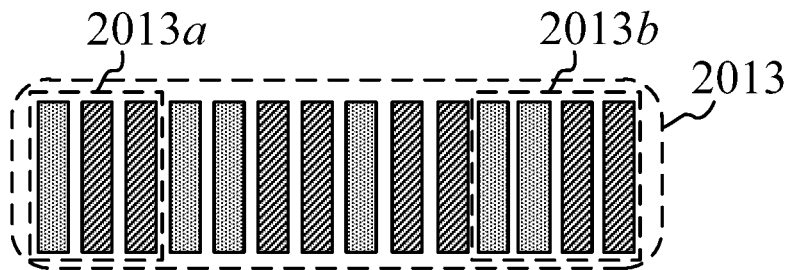
FIG. 2D illustrates a schematic diagram of another arrangement of a first pad group of an exemplary touch display panel consistent with disclosed embodiments of the present disclosure.
Figure 2E:
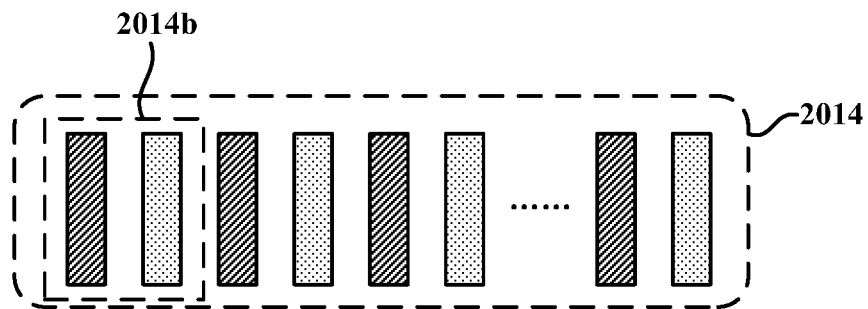
FIG. 2E illustrates a schematic diagram of another arrangement of a first pad group of an exemplary touch display panel consistent with disclosed embodiments of the present disclosure.

FIG. 2A illustrates a schematic diagram of a bonding region of another touch display panel in the present disclosure; FIG. 2B illustrates a schematic diagram of an arrangement of a first pad group of another touch display panel; FIG. 2C illustrates a schematic diagram of an arrangement of a first pad group of another touch display panel; FIG. 2D illustrates a schematic diagram of an arrangement of a first pad group of another touch display panel; and FIG. 2E illustrates a schematic diagram of an arrangement of a first pad group of another touch display panel.

Referring to FIG. 2A, in one embodiment, a plurality of first pad groups 201 may be formed in the bonding region. The first pad group 201 may include a first pad and a second pad, and the first pad and the second pad may be arranged along a first direction D1. In one embodiment, a direction perpendicular to the first direction D1 may refer to a second direction D2. It may be understood that the bonding region may be formed by the plurality of first pad groups 201 repeatedly arranged along the first direction D1. In another embodiment, the bonding region may be formed by the plurality of first pad groups 201 and a plurality of first pads or a plurality of second pads arranged along the first direction D1.

For example, in certain application scenarios, the touch display panel in the disclosed embodiments may include 1080 first pads and 648 second pads. To facilitate the fabrication of pads in the bonding region, the bonding region may be configured to be formed by the plurality of repeatedly arranged first pad groups 201.

FIG. 2B illustrates an arrangement of a first pad group 2011. The first pad group 2011 may include a first repeating unit 2011a and a second repeating unit 2011b. Both the first repeating unit 2011a and the second repeating unit 2011b may include at least one first pad and at least one second pad. Further, a ratio of a quantity of the first pads over a quantity of the second pads in the first repeating unit 2011a may be about 2:1, and a ratio of a quantity of the first pads over a quantity of the second pads in the second repeating unit 2011b may be about 1:1. In one embodiment, the first pad group 2011 may be configured to include four first repeating units 2011a and one second repeating unit 2011b. Accordingly, the bonding region may include 108 repeatedly arranged first bonding groups 2011.

FIG. 2C illustrates another arrangement of a first pad group 2012. Referring to FIG. 2C, the first pad group 2012 may include a first repeating unit 2012a. The first repeating unit 2012a may include at least one first pad and at least one second pad, and a ratio of a quantity of the first pads over a quantity of the second pads may be about 2:1. It may be understood that when the touch display panel includes 1080 first pads and 648 second pads, after the plurality of first pad groups 2012 are repeatedly arranged, a plurality of second pads may be remained. The plurality of remaining second pads may be evenly distributed between the first pad groups 2012, or may be centrally disposed in the middle part of the touch display panel, or may be disposed between any two first pad groups 2012.

FIG. 2D illustrates another arrangement of a first pad group 2013. The first pad group 2013 may include a first repeating unit 2013a and a second repeating unit 2013b. Both the first repeating unit 2013a and the second repeating unit 2013b may include at least one first pad and at least one second pad. Further, a ratio of a quantity of the first pads over a quantity of the second pads in the first repeating unit 2013a may be about 1:2, and a ratio of a quantity of the first pads over a quantity of the second pads in the second repeating unit 2013b may be about 1:1. Similar to the structure of the first pad group 2012 illustrated in FIG. 2C, after the plurality of first pad groups 2013 are repeatedly arranged, a plurality of first pads may be remained. In one embodiment, the plurality of remaining first pads may be evenly distributed between the first pad groups 2013. In another embodiment, the plurality of remaining first pads may be centrally disposed between any two first pad groups 2013.

FIG. 2E illustrates another arrangement of a first pad group 2014. The first pad group 2014 may include a second repeating unit 2014b. The second repeating unit 2014b may include at least one first pad and at least one second pad, and a ratio of a quantity of the first pads over a quantity of the second pads in the second repeating unit 2014b may be about 1:1. Similar to the structures of the first pad group 2012 illustrated in FIG. 2C and the first pad group 2013 illustrated in FIG. 2D, after the plurality of first pad groups 2014 are repeatedly arranged, a plurality of first pads may be remained. In one embodiment, the plurality of remaining first pads may be evenly distributed between the first pad groups 2014. In another embodiment, the plurality of remaining first pads may be centrally disposed between any two first pad groups 2014.

Referring to FIGS. 2B-2E, the first pad group may include at least two adjacent first pads, and at least one second pad may be disposed between the two first pads. In the touch display panel provided by the disclosed embodiments of the present disclosure, by setting the arrangement of the first pads and the second pads in the first pad group, the bonding region may be conveniently fabricated, and at the same time, the size of the border-bottom of the touch display panel may be reduced.

Figure 3A:
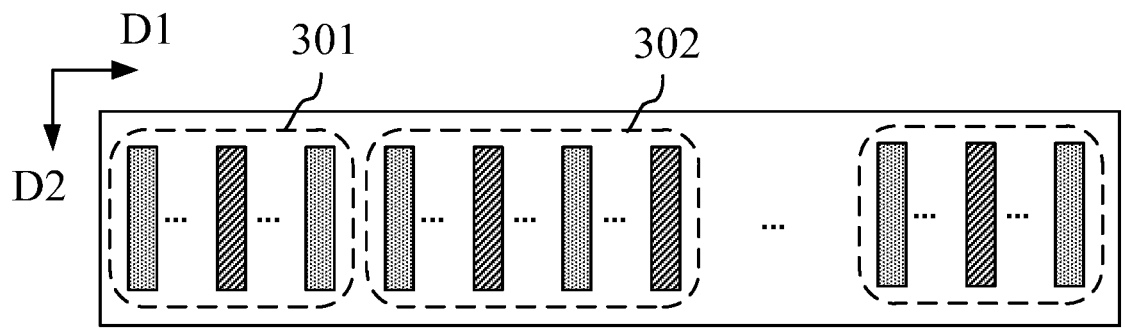
FIG. 3A illustrates a schematic diagram of a bonding region of another exemplary touch display panel consistent with disclosed embodiments of the present disclosure.
Figure 3B:
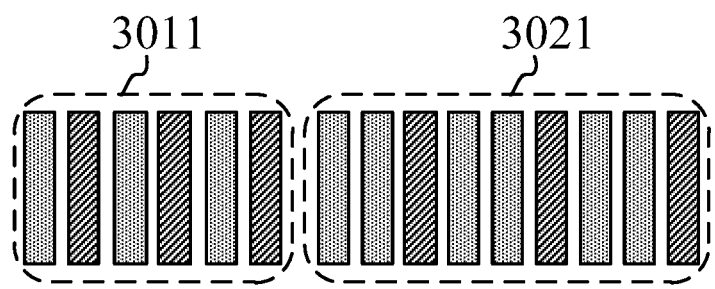
FIG. 3B illustrates a schematic diagram of an arrangement of a first pad group and a second pad group of an exemplary touch display panel consistent with disclosed embodiments of the present disclosure.
Figure 3C:
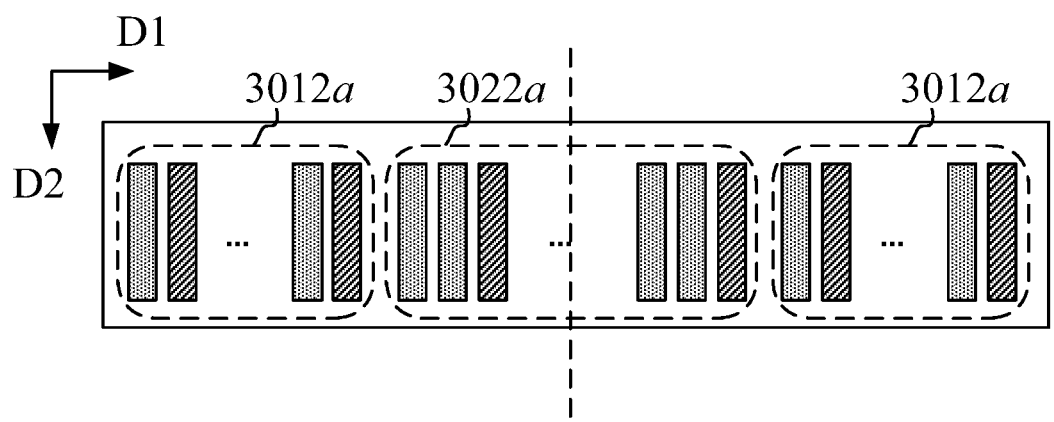
FIG. 3C illustrates a schematic diagram of an arrangement of a bonding region formed using the first pad group and the second pad group of an exemplary touch display panel illustrated in FIG. 3B consistent with disclosed embodiments of the present disclosure.
Figure 3D:
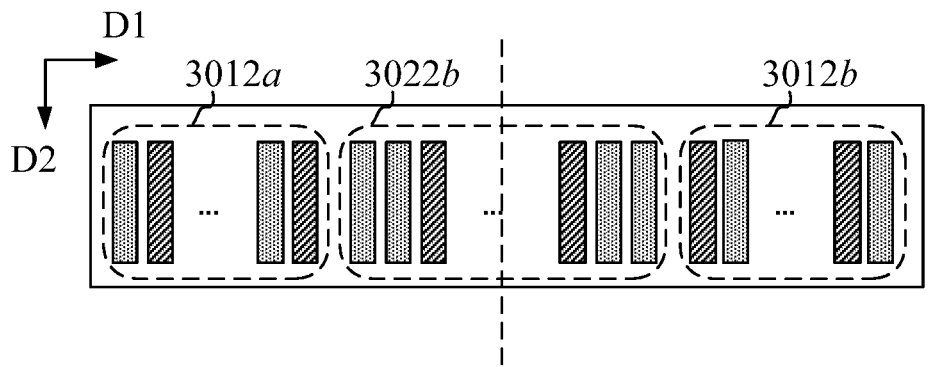
FIG. 3D illustrates a schematic diagram of another arrangement of a bonding region formed using the first pad group and the second pad group of an exemplary touch display panel illustrated in FIG. 3B consistent with disclosed embodiments of the present disclosure.
Figure 3E:
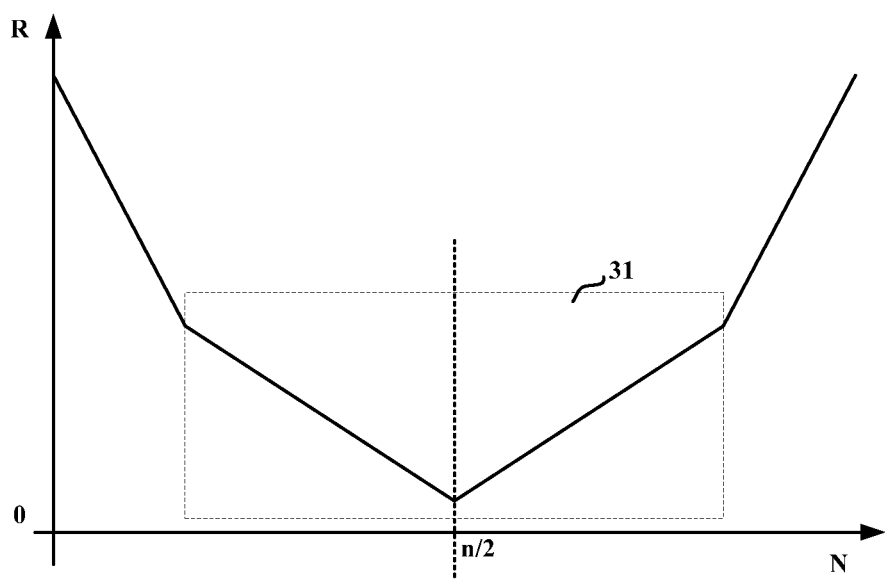
FIG. 3E illustrates when using the arrangement of the first pads and the second pads illustrated in FIG. 3D, a diagram of a change trend of resistance values of touch control signal lines of an exemplary touch display panel consistent with disclosed embodiments of the present disclosure.

FIG. 3A illustrates a schematic diagram of a bonding region of another touch display panel in the present disclosure; FIG. 3B illustrates a schematic diagram of an arrangement of a first pad group and a second pad group; FIG. 3C illustrates a schematic diagram of an arrangement of a bonding region formed by the first pad group and the second pad group illustrated in FIG. 3B; FIG. 3D illustrates a schematic diagram of an arrangement of another bonding region formed by the first pad group and the second pad group illustrated in FIG. 3B; and FIG. 3E illustrates when using the arrangement of the first pads and the second pads illustrated in FIG. 3D, a diagram of a change trend of resistance values of touch control signal lines of the touch display panel in the present disclosure.

Referring to FIG. 3A, in one embodiment, a plurality of first pad groups 301 and second pad group 302 may be formed in the bonding region. A sum of a quantity of the first pads and a quantity of the second pads in the first pad group 301 may be not equal to a sum of a quantity of the first pads and a quantity of the second pads in the second pad group 302. In other words, the first pad group 301 may have a quantity of pads different from the second pad group 302.

FIG. 3B illustrates a schematic diagram of an arrangement of a first pad group 3011 and a second pad group 3021. Both the first pad group 3011 and the second pad group 3021 may include at least one first pad and at least one second pad, and the first pad group 3011 may have a sum of a quantity of the first pads and a quantity of the second pads different from the second pad group 3021. Further, the first pad group 3011 may be formed by the plurality of repeatedly arranged second repeating units. In other words, in the first pad group 3011, a ratio of the quantity of the first pads over the quantity of the second pads may be about 1:1. The second pad group 3021 may be formed by the plurality of repeatedly arranged first repeating units. In other words, in the second pad group 3021, a ratio of the quantity of the first pads over the quantity of the second pads may be about 2:1. The bonding region may be formed by at least one first pad group 3011 and at least one second pad group 3021 arranged along the first direction D1. Accordingly, in the first pad group 3011, the quantity of the first pads may be different from the quantity of the second pads; and in the second pad group 3021, the quantity of the first pads may be different from the quantity of the second pads. At the same time, a ratio of the quantity of the first pads over the quantity of the second pads in the first pad group 3011 may be different from a ratio of the quantity of the first pads over the quantity of the second pads in the second pad group 3021.

When the touch display panel includes 1080 first pads and 648 second pads, the first pad group 3011 may include 108 second repeating units, and the second pad group 3021 may include 432 first repeating units. Accordingly, the bonding region may be formed by two first pad groups 3011 and one second pad group 3021 arranged along the first direction D1.

Referring to FIG. 3C, to facilitate the fabrication of each first pad and each second pad in the bonding region, a second pad group 3022a may be configured to be disposed in a central region of the touch display panel, and two first pad groups 3012a may be disposed on both sides of the second pad group 3022a. At the same time, a symmetry axis of the second pad group 3022a along the second direction D2 may be configured to be coincided with a symmetry axis (dotted line in FIG. 3C) of the touch display panel along the second direction D2.

FIG. 3D illustrates another arrangement of two first pad groups 3011 and one second pad group 3021. A first pad group 3012a and a first pad group 3012b may be disposed on both sides of the second pad group 3022b. Each first pad in the first pad group 3012a and each first pad in the first pad group 3012b may be symmetrically arranged with respect to a symmetry axis (dotted line in FIG. 3D) where the touch display panel extends along the second direction D2. At the same time, each second pad in the first pad group 3012a and each second pad in the first pad group 3012b may also be symmetrically arranged with respect to the aforementioned symmetry axis.

In certain embodiments, respective first pads in the second pad group 3022b may be symmetrically arranged with respect to the aforementioned symmetry axis. At the same time, respective second pads in the second pad group 3022b may be symmetrically arranged with respect to the aforementioned symmetry axis. In view of this, respective first pads and respective second pads in the bonding region may be symmetrically arranged with respect to the symmetry axis where the touch display panel extends along the second direction D2. Therefore, in a central region close to the symmetry axis where the touch display panel extends along the second direction, the length difference of the touch control signal lines electrically connected to the second pads may be weakened to a certain degree. Accordingly, the difference in resistance values of the touch control signal lines in the central region may also be weakened, which may facilitate the consistency of the transmission speed and the signal quantity of the touch signals (including the touch driving signals and/or the touch sensing signals) in the central region, and may facilitate improving the accuracy of the touch detection.

FIG. 3E illustrates when using the arrangement of the first pads and the second pads illustrated in FIG. 3D, a diagram of a change trend of resistance values of the touch control signal lines in the touch display panel in the present disclosure. An abscissa indicates positions of the touch control signal lines in the touch display panel, for example, from one side (e.g., left side) of the touch display panel, the first touch control signal line to the $N^{th}$ touch control signal line. The position shown by the dotted line is the position of the symmetry axis where the touch display panel extends along the second direction. In addition, an ordinate of FIG. 3E indicates the resistance values.

In one embodiment, referring to FIG. 3E, a region close to the symmetry axis where the touch display panel extends along the second direction (a region indicated by reference numeral 31 in FIG. 3E) may have a change trend (i.e., absolute value of the slope) of the resistance values of the touch control signal lines significantly smaller than a region away from the symmetry axis where the touch display panel extends along the second direction. Therefore, in the region indicated by the reference numeral 31, the difference in resistance values of the touch control signal lines may be weakened, which may facilitate consistency of the transmission speed and the signal quantity of the touch signals (including the touch driving signals and/or the touch sensing signals) in the central region, and may facilitate improving the accuracy of the touch detection.

Figure 3F:
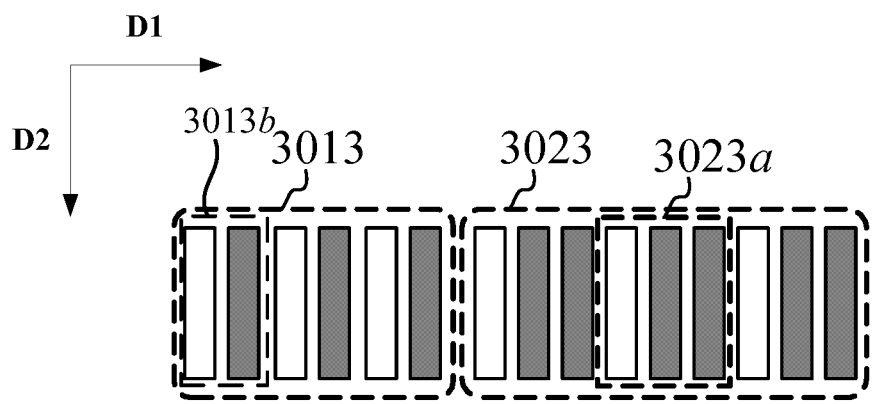
FIGS. 3F-3H illustrate schematic diagrams of arrangements of a first pad group and a second pad group of an exemplary touch display panel consistent with disclosed embodiments of the present disclosure.

FIG. 3F illustrates an arrangement of a first pad group 3013 and a second pad group 3023. The difference between the arrangements illustrated in FIG. 3F and FIG. 3B may include that, in the arrangement illustrated in FIG. 3F, the second pad group 3023 may be formed by a plurality of repeatedly arranged first repeating units 3023a, and a ratio of the quantity of the first pads over the quantity of the second pads in the first repeating unit 3023a may be about 2:1. In addition, in the arrangement illustrated in FIG. 3F, the first pad group 3013 may be formed by a plurality of repeatedly arranged second repeating units 3013b.

It may be understood that for a touch display panel including 1080 first pads and 648 second pads, through reasonably configuring the quantity of the second repeating units 3013b in the first pad group 3013 and the quantity of the first repeating units 3023a in the second pad group 3023 in the arrangement illustrated in FIG. 3F, the bonding region may be formed by at least one first pad group 3013 and at least one second pad group 3023 arranged along the first direction, and the first pad or the second pad may not be remained.

Figure 3G:
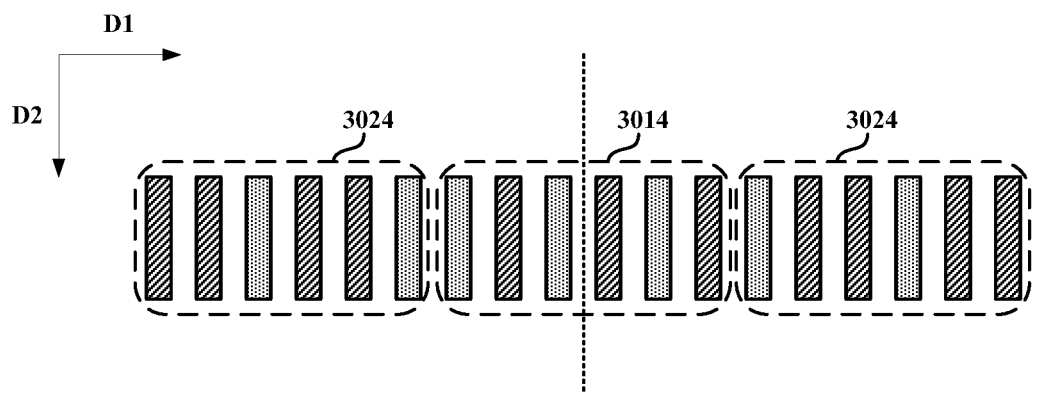

In certain embodiments, referring to FIG. 3G, a first pad group 3014 may be centrally disposed in a central region of the bonding region, and a second pad group 3024 may be disposed in edge regions on both sides of the first pad group 3014.

Figure 3H:
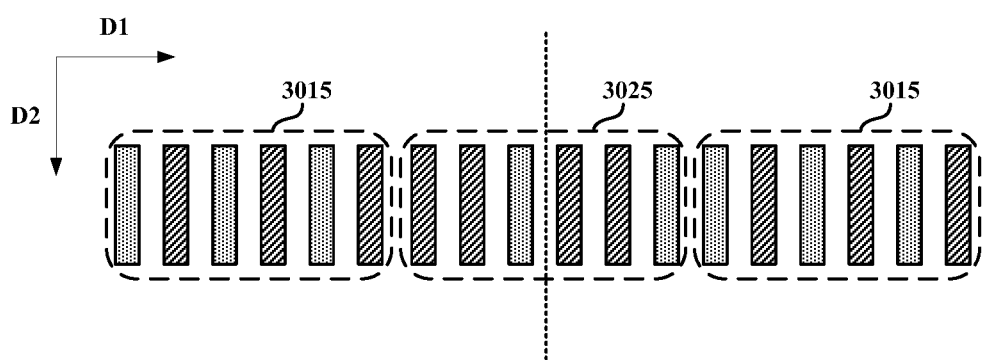

In other certain embodiments, referring to FIG. 3H, a second pad group 3025 may be centrally disposed in a central region of the bonding region, and a first pad group 3015 may be disposed in edge regions on both sides of the second pad group 3025.

Figure 3I:
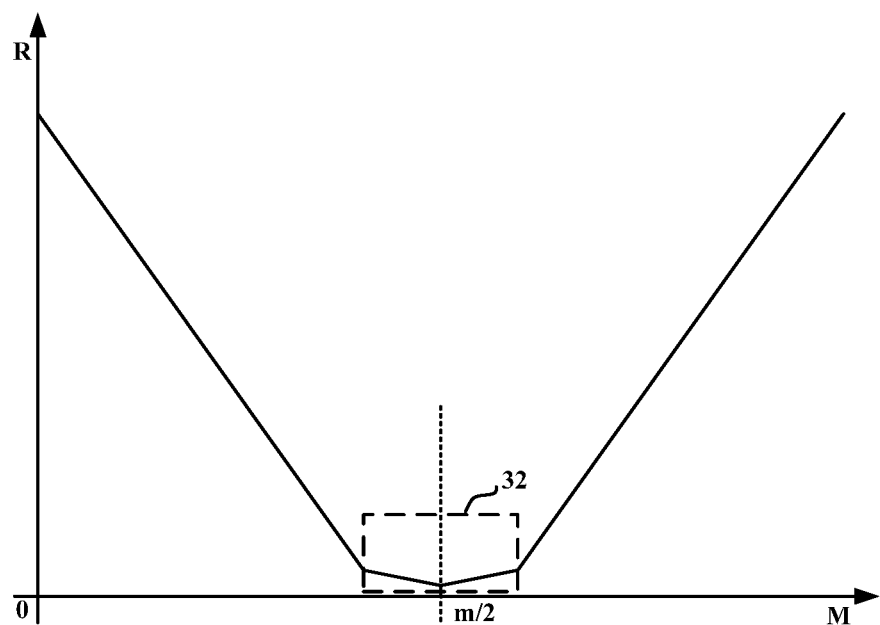
FIG. 3I illustrates when using the arrangement of the first pads and the second pads illustrated in FIG. 3G, a diagram of a change trend of resistance values of data lines of an exemplary touch display panel consistent with disclosed embodiments of the present disclosure.

FIG. 3I illustrates after using the arrangement illustrated in FIG. 3G, a diagram of a change trend of resistance values of the data lines. An abscissa indicates positions of the data lines in the touch display panel, for example, from one side (e.g., left side) of the touch display panel, the first data line to the $M^{th}$ data line. The position shown by the dotted line is the position of the symmetry axis where the touch display panel extends along the second direction. In addition, an ordinate of FIG. 3I indicates the resistance values.

In one embodiment, referring to FIG. 3I, a region close to the symmetry axis where the touch display panel extends along the second direction (a region indicated by reference numeral 32 in FIG. 3I) may have a change trend (i.e., absolute value of the slope) of the resistance values of the data lines significantly smaller than a region away from the symmetry axis where the touch display panel extends along the second direction. Therefore, in the region indicated by the reference numeral 32, the difference in resistance values of the data lines may be weakened, which may facilitate consistency of the transmission speed and the signal quantity of the display signals in the central region, and may facilitate improving the uniformity of the display luminance.

Figure 3J:
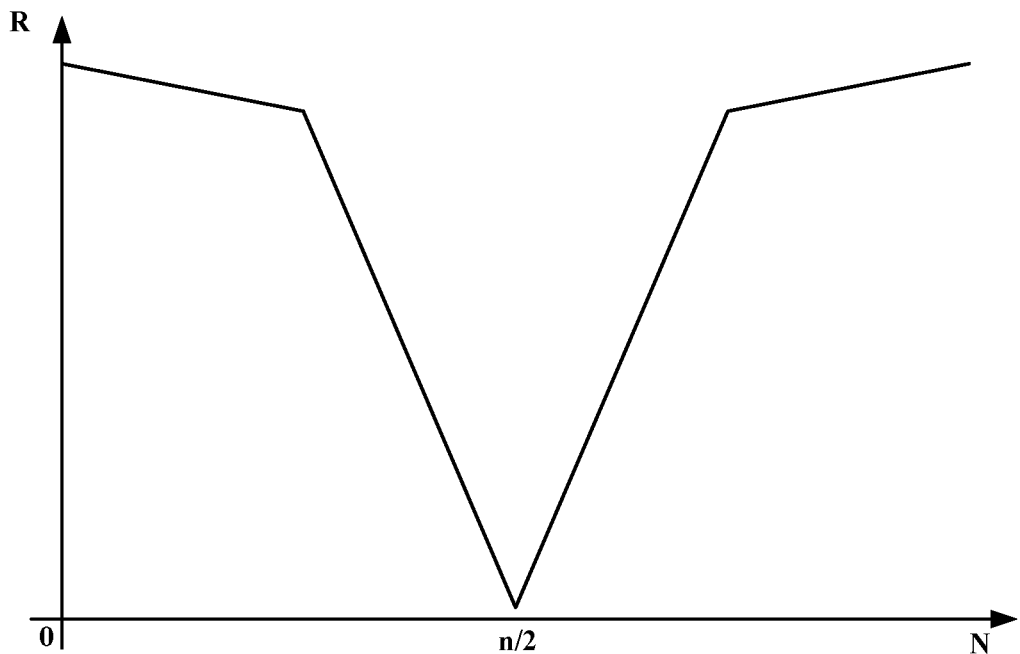
FIG. 3J illustrates when using the arrangement of the first pads and the second pads illustrated in FIG. 3H, a diagram of a change trend of resistance values of touch control signal lines of an exemplary touch display panel consistent with disclosed embodiments of the present disclosure.

FIG. 3J illustrates after using the arrangement illustrated in FIG. 3H, a diagram of a change trend of resistance values of the touch control signal lines. An abscissa indicates positions of the touch control signal lines in the touch display panel, for example, from one side (e.g., left side) of the touch display panel, the first touch control signal line to the $N^{th}$ touch control signal line. The position shown by the dotted line is the position of the symmetry axis where the touch display panel extends along the second direction. In addition, an ordinate of FIG. 3J indicates the resistance values.

In one embodiment, referring to FIG. 3J, after using the arrangement illustrated in FIG. 3H, the diagram of resistance values of the touch control signal lines of the touch display panel may have three inflection points. Accordingly, in the entire touch display panel, a change in the resistance values of the touch control signal lines may be substantially uniform. When the data signals transmitted by the touch control signal lines are the same, the signal attenuation between adjacent touch control signal lines may be substantially close, which may facilitate uniformity of accuracy and sensitivity of touch detection at different locations of the touch display panel. On the other hand, when the touch control electrodes electrically connected to the touch control signal lines are multiplexed as common electrodes, common voltage signals received by the common electrodes may be substantially uniform, which may facilitate the display luminance uniformity of the touch display panel.

Figure 3K:
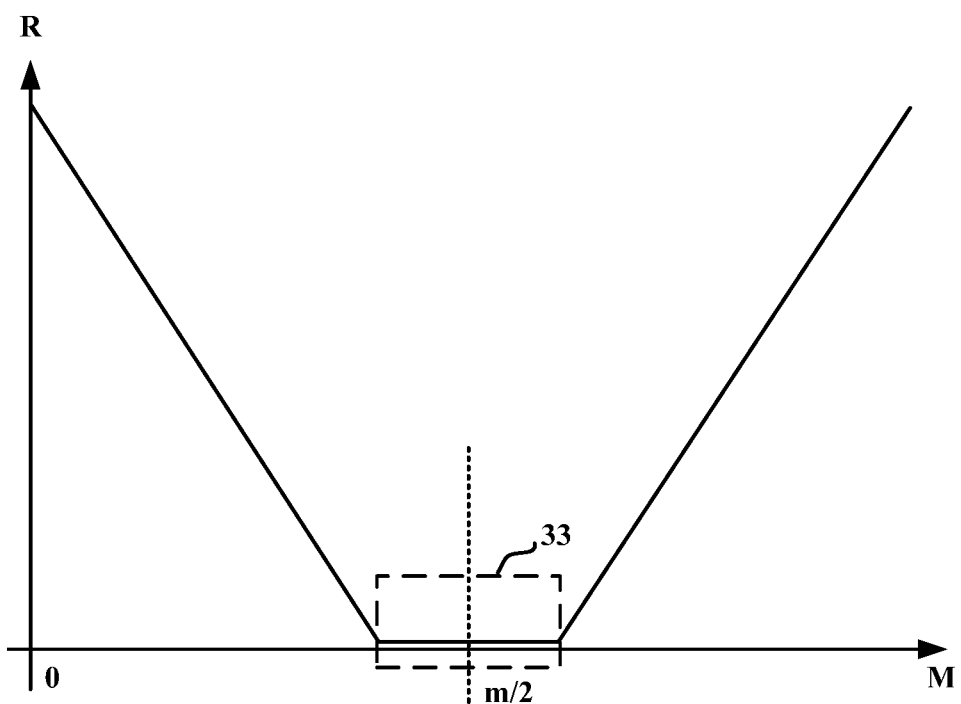
FIG. 3K illustrates when using the arrangement of the first pads and the second pads illustrated in FIG. 3H, a diagram of a change trend of resistance values of data lines of an exemplary touch display panel consistent with disclosed embodiments of the present disclosure.

FIG. 3K illustrates after using the arrangement illustrated in FIG. 3H, a diagram of a change trend of resistance values of the data lines. An abscissa indicates positions of the data lines in the touch display panel, for example, from one side (e.g., left side) of the touch display panel, the first data line to the $M^{th}$ data line. The position shown by the dotted line is the position of the symmetry axis where the touch display panel extends along the second direction. In addition, an ordinate of FIG. 3K indicates the resistance values.

In one embodiment, referring to FIG. 3K, after using the arrangement illustrated in FIG. 3H, in a region close to the center of the touch display panel (a region indicated by reference numeral 33 in FIG. 3K), the resistance values of the data lines may be uniform. Therefore, in the region close to the center of the touch display panel, when the data signals transmitted by the data lines are same, the signal attenuation of the data lines may be substantially uniform, which may facilitate the display luminance uniformity of the touch display panel.

Figure 3L:
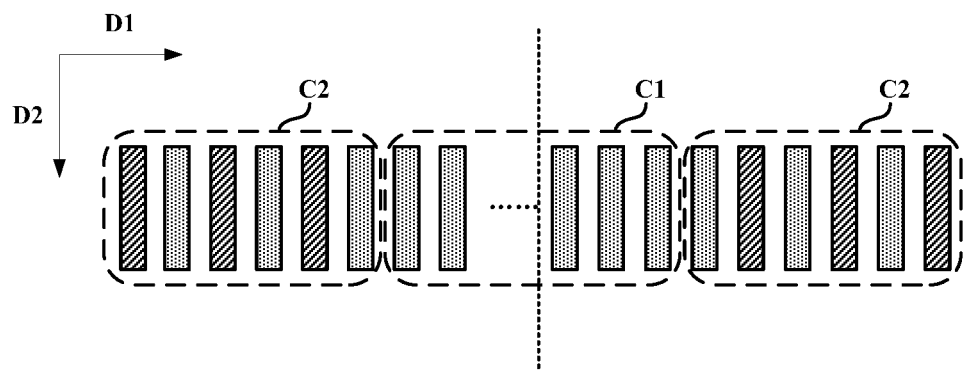
FIG. 3L illustrates a schematic diagram of an arrangement of first pads and second pads of an exemplary touch display panel consistent with disclosed embodiments of the present disclosure.

In certain embodiments, referring to FIG. 3L, a plurality of first pads may be formed in a central region C1, and a plurality of first pads and a plurality of second pads may be formed in edge regions on both sides of the central region C1. In other certain embodiments, a plurality of second pads may be formed in the central region, and a plurality of first pads and a plurality of second pads may be formed in the edge regions on both sides of the central region.

Figure 3M:
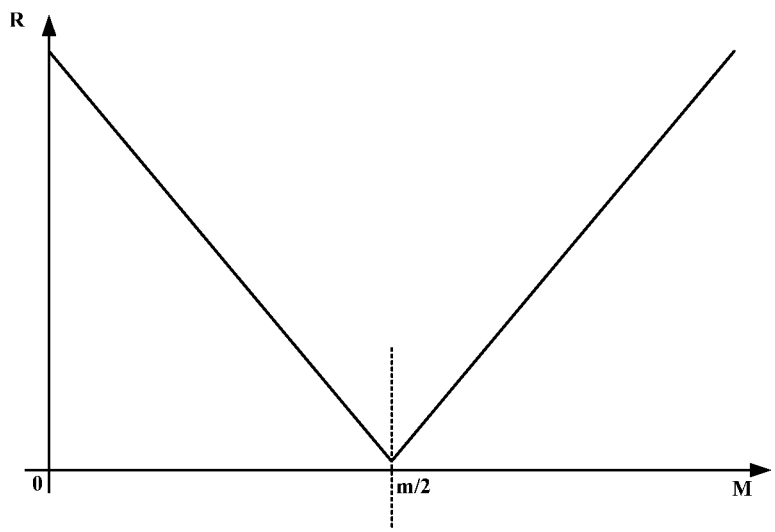
FIG. 3M illustrates when using the arrangement of the first pads and the second pads illustrated in FIG. 3L, a diagram of a change trend of resistance values of data lines of an exemplary touch display panel consistent with disclosed embodiments of the present disclosure.

FIG. 3M illustrates after using the arrangement illustrated in FIG. 3L, a diagram of a change trend of resistance values of the data lines. An abscissa indicates positions of the data lines in the touch display panel, for example, from one side (e.g., left side) of the touch display panel, the first data line to the $M^{th}$ data line. The position shown by the dotted line is the position of the symmetry axis where the touch display panel extends along the second direction. In addition, an ordinate of FIG. 3M indicates the resistance values.

In one embodiment, referring to FIG. 3M, after using the arrangement illustrated in FIG. 3L, the diagram of resistance values of the data lines of the touch display panel may have one inflection point. Accordingly, in the entire touch display panel, a change in the resistance values of the data lines may be substantially uniform. When the data signals transmitted by the data lines are the same, the signal attenuation between adjacent data lines may be substantially close, which may facilitate the display luminance uniformity of the touch display panel.

Figure 3N:
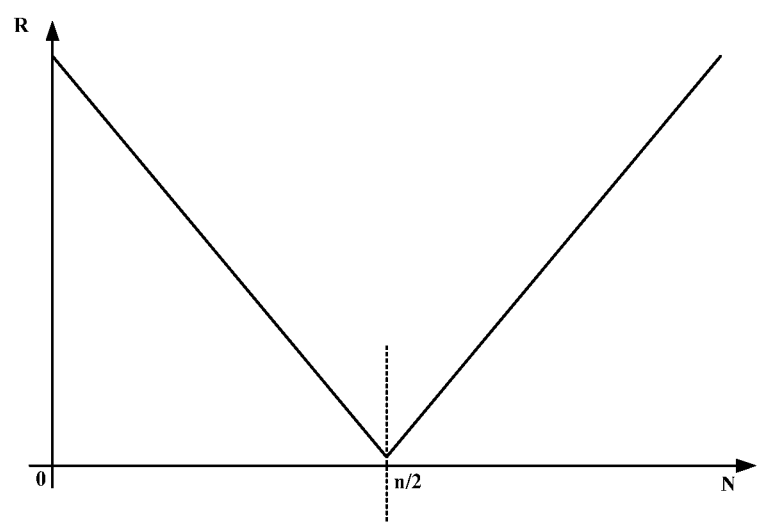
FIG. 3N illustrates when using the arrangement of the first pads and the second pads illustrated in FIG. 3L, a diagram of a change trend of resistance values of touch control signal lines of an exemplary touch display panel consistent with disclosed embodiments of the present disclosure.

FIG. 3N illustrates after using the arrangement illustrated in FIG. 3L, a diagram of a change trend of resistance values of the touch control signal lines. An abscissa indicates positions of the touch control signal lines in the touch display panel, for example, from one side (e.g., left side) of the touch display panel, the first touch control signal line to the $N^{th}$ touch control signal line. The position shown by the dotted line is the position of the symmetry axis where the touch display panel extends along the second direction. In addition, an ordinate of FIG. 3N indicates the resistance values.

In one embodiment, referring to FIG. 3N, after using the arrangement illustrated in FIG. 3L, the diagram of resistance values of the touch control signal lines of the touch display panel may have one inflection point. Accordingly, in the entire touch display panel, a change in the resistance values of the touch control signal lines may be substantially uniform. When the data signals transmitted by the touch control signal lines are the same, the signal attenuation between adjacent touch control signal lines may be substantially close, which may facilitate uniformity of accuracy and sensitivity of touch detection. On the other hand, when the touch control electrodes electrically connected to the touch control signal lines are multiplexed as common electrodes, common voltage signals received by the common electrodes may be substantially uniform, which may facilitate the display luminance uniformity of the touch display panel.

It can be understood that the disclosed central region may be a partial region of the bonding region including the symmetry axis where the touch display panel extends along the second direction D2, and the central region may be symmetrical with respect to the symmetry axis. The disclosed edge regions may be the regions on both sides of the central region. In one embodiment, the central region may include at least one first pad group, and the edge regions may include at least two second pad groups.

In certain embodiments, the bonding region may include even-number first pad groups and one second pad group. Further, the even-number first pad groups may be symmetrically disposed with respect to the second pad group. In other certain embodiments, the bonding region may include a plurality of first pad groups and a plurality of second pad groups, and the plurality of first pad groups and the plurality of second pad groups may be alternately arranged.

In the touch display panel provided by the disclosed embodiments, the respective pads of the bonding region may be formed by the first pad group and the second pad group arranged along the first direction, which may facilitate the fabrication of the pads in the bonding region.

Figure 4:
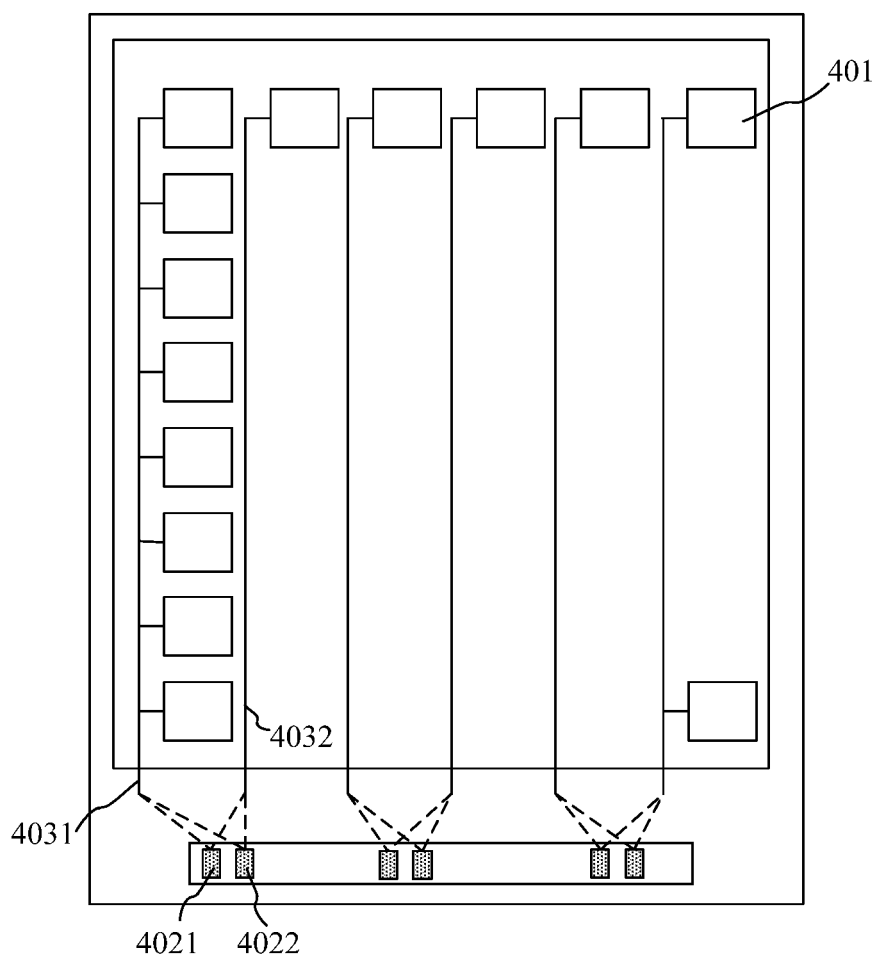
FIG. 4 illustrates a schematic diagram of another exemplary touch display panel consistent with disclosed embodiments of the present disclosure.

FIG. 4 illustrates a schematic diagram of another touch display panel in the present disclosure. Referring to FIG. 4, a display region of the touch display panel may include a plurality of pixel electrodes 401, and the plurality of pixel electrodes 401 may be arranged in an array. The pixel electrodes 401 arranged in a column direction may be electrically connected to a same data line. In other words, first-column pixel electrodes 401 may be electrically connected to a data line 4031, and second-column pixel electrodes 402 may be electrically connected to a data line 4032.

There may be no second pad between the $N^{th}$ first pad and the $(N+1)^{th}$ first pad among the plurality of first pads of the bonding region, where N may be an odd number. The $N^{th}$ first pad and the $(N+1)^{th}$ first pad may be electrically connected to the $N^{th}$-column pixel electrodes and the $(N+1)^{th}$-column pixel electrodes, respectively.

Referring to FIG. 4, there may be no second pad between the $1^{st}$ first pad 4021 and the $2^{nd}$ first pad 4022. At the same time, the $1^{st}$ first pad 4021 and the $2^{nd}$ first pad 4022 may be electrically connected to the $1^{st}$-column pixel electrodes and the $2^{nd}$-column pixel electrodes, respectively.

In view of this, in one embodiment, when the disclosed structure is applied to a liquid crystal display panel, to reduce a coupling capacitance between the data line and the common electrode, data signals of different polarities may be provided to adjacent data lines to enable the coupling capacitance between adjacent data line and common electrode to have opposite polarities, which may cancel each other. For example, a positive data signal and a negative data signal may be provided to two adjacent data lines, respectively.

The positive data signal may be a signal higher than the level of the common signal, and the negative data signal may be a signal lower than the level of the common signal. At the same time, to ensure that liquid crystal molecules can be normally flipped, a negative data signal may be provided to a pixel electrode providing a positive data signal, and a positive data signal may be provided to a pixel electrode providing a negative data signal at the next moment.

The touch display panel provided by the disclosed embodiments may effectively reduce the coupling capacitance between the data line and the common electrode, and improve the display performance of the touch display panel.

Figure 5:
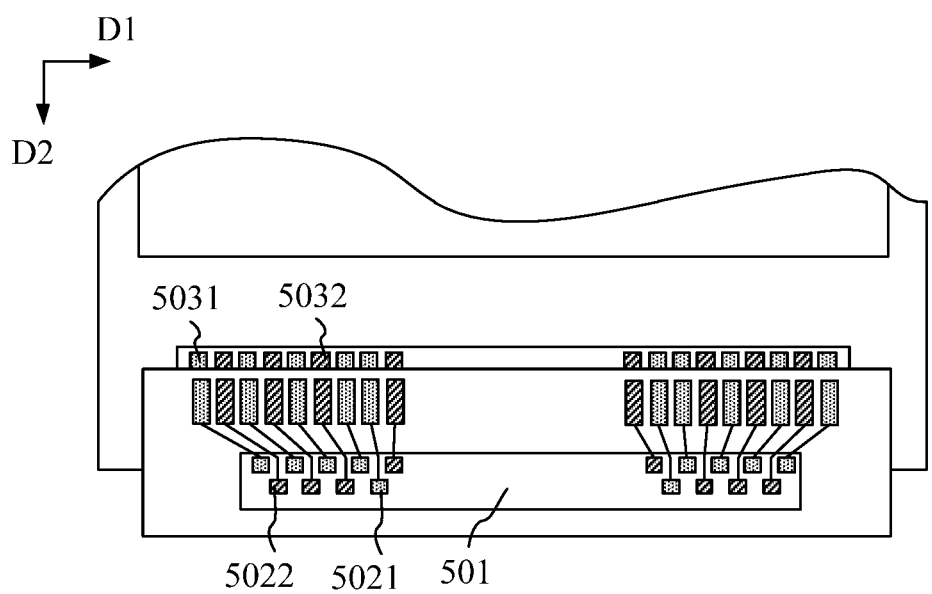
FIG. 5 illustrates a schematic diagram of a driving circuit pin of an exemplary touch display panel consistent with disclosed embodiments of the present disclosure.

FIG. 5 illustrates a schematic diagram of a driving circuit pin of a touch display panel in the present disclosure. Referring to FIG. 5, in one embodiment, a driving circuit 501 may include a first pin 5021 and a second pin 5022. The first pin 5021 may be electrically connected to a first pad 5031 of the bonding region, and the second pin 5022 may be electrically connected to a second pad 5032 of bonding region. The first pad 5031 and the second pad 5032 of the bonding region may be arranged along the first direction D1.

A projection sequence of the first pin 5021 and the second pin 5022 in the driving circuit 501 onto the first direction D1 may be the same as the arrangement sequence of the first pad 5031 and the second pad 5032 along the first direction D1.

In certain embodiments, the driving circuit 501 may include two-row pins arranged along the first direction D1, and the pins in each row may include a plurality of first pins 5021 and a plurality of second pins 5022. At the same time, to ensure that the connection line between the pin and the pad are as short as possible, the projections of the pins in each row onto the first direction D1 may not coincide. In other certain embodiments, the disclosed driving circuit 501 may include at least two-row pins arranged along the first direction.

In the touch display panel provided by the disclosed embodiments, through configuring a plurality of pins on the driving circuit, the driving circuit may simultaneously provide signals to the pixel electrodes and the touch control electrodes. At the same time, through configuring two-row pins in the driving circuit, the size of the driving circuit may be effectively reduced. Through configuring the projections of pins in each row onto the arrangement direction of the pads to be not overlapped, the length of the connection line between the pin and the pad may be effectively shorten to reduce signal attenuation.

Figure 6:
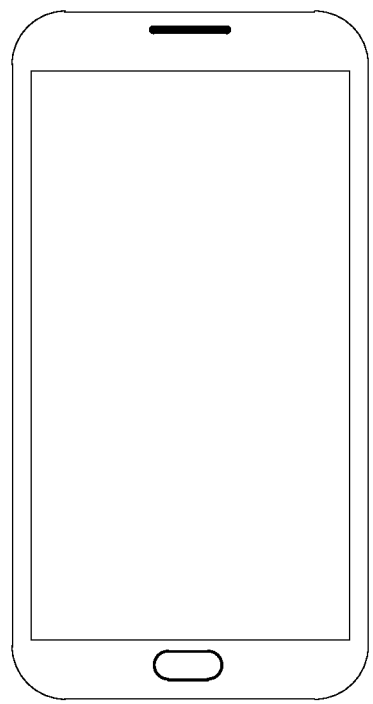
FIG. 6 illustrates a schematic diagram of an exemplary touch display device consistent with disclosed embodiments of the present disclosure.

The present disclosure also provides a touch display device. Referring to FIG. 6, a touch display device 600 may include any one of the disclosed touch display panels. Through configuring a plurality of first pads and a plurality of second pads in the bonding region of the touch display panel, one side of at least four first pads may be simultaneously arranged adjacent to the second pads. Accordingly, the height occupied by the fan-out region may be effectively reduced, and the size of the border-bottom of the touch display panel may be further reduced.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and features disclosed herein.

What is claimed is:

1. A touch display panel, comprising: a display region and a non-display region, wherein the display region includes a plurality of pixel electrodes and a plurality of touch control electrodes, and the non-display region includes a fan-out region and a bonding region used to bond a driving circuit, wherein: the bonding region includes pads, the pads including a plurality of first pads and a plurality of second pads, the plurality of first pads and the plurality of second pads contain first and second pads, arranged to form a first type of pad group, the plurality of first pads and the plurality of second pads further contain first and second pads, arranged to form a second type of pad group, the second type of pad group is different from the first type of pad group, the first type of pad group is disposed in a central region of the bonding region, and the same second type of pad group is disposed in an edge region on each side of the first type of pad group, a first pad of the plurality of first pads is electrically connected to one of signal output terminals of the driving circuit for providing a data signal to a pixel electrode of the plurality of pixel electrodes, a second pad of the plurality of second pads is electrically connected to one of signal input terminals of the driving circuit for one or more of: receiving a touch control signal collected by the touch control electrodes and providing the touch control signal to the touch control electrodes, and the fan-out region includes a plurality of first trace wires electrically connected to the plurality of pixel electrodes as well as the plurality of first pads, and a plurality of second trace wires electrically connected to the plurality of touch control electrodes as well as the plurality of second pads, wherein: one of the first type of pad group and the second type of pad group includes: a first pad group including: one or more of a first repeating unit and a second repeating unit, wherein the first repeating unit includes at least one first pad and at least one second pad, and the second repeating unit includes at least one first pad and at least one second pad; and a ratio of a quantity of first pads over a quantity of second pads in the first repeating unit is 2:1 or 1:2, and a ratio of a quantity of first pads over a quantity of second pads in the second repeating unit is 1:1.

2. The touch display panel according to claim 1, wherein: another of the first type of pad group and the second type of pad group includes: a second pad group, wherein: a sum of a quantity of first pads and a quantity of second pads in the first pad group is not equal to a sum of a quantity of first pads and a quantity of second pads in the second pad group.

3. The touch display panel according to claim 2, wherein: the quantity of the first pads in the second pad group is not equal to the quantity of the first pads in the first pad group; and the quantity of the second pads in the second pad group is not equal to the quantity of the second pads in the first pad group.

4. The touch display panel according to claim 2, wherein: a ratio of the quantity of the first pads over the quantity of the second pads in the first pad group is not equal to a ratio of the quantity of the first pads over the quantity of the second pads in the second pad group.

5. The touch display panel according to claim 2, wherein: the second pad group is formed by repeatedly arranged first repeating units; and a ratio of a quantity of first pads over a quantity of second pads in a first repeating unit is 2:1.

6. The touch display panel according to claim 5, wherein: the first pad group is formed by repeatedly-arranged second repeating units.

7. The touch display panel according to claim 2, wherein: the plurality of first pads in the bonding region are symmetrically arranged with respect to a symmetry axis where the touch display panel extends along a second direction, and the plurality of second pads in the bonding region are symmetrically arranged with respect to the symmetry axis where the touch display panel extends along the second direction, wherein the first direction is perpendicular to the second direction.

8. The touch display panel according to claim 2, wherein: in the first pad group, the plurality of first pads are symmetrically arranged with respect to a symmetry axis where the touch display panel extends along a second direction, and the plurality of second pads are symmetrically arranged with respect to the symmetry axis where the touch display panel extends along the second direction, wherein the first direction is perpendicular to the second direction.

9. The touch display panel according to claim 1, wherein: the plurality of pixel electrodes are arranged in an array; the second pad of the plurality of second pads is not disposed between a $N^{th}$ first pad and a $(N+1)^{th}$ first pad of the plurality of first pads in the bonding region; and the $N^{th}$ first pad and the $(N+1)^{th}$ first pad are electrically connected to $N^{th}$-column pixel electrodes and $(N+1)^{th}$-column pixel electrodes, respectively, wherein N is an odd-number.

10. The touch display panel according to claim 1, wherein: the driving circuit includes a first pin and a second pin, wherein the first pin is electrically connected to a first pad, and the second pin is electrically connected to a second pad; and an arrangement order of the first pin and the second pin along the first direction is the same as an arrangement order of a first pad and a second pad.

11. The touch display panel according to claim 10, wherein: the driving circuit includes at least two-row pins arranged along the first direction; pins in each row include a plurality of first pins and a plurality of second pins; and the projections of respective-row pins onto the first direction do not coincide.

12. The touch display panel according to claim 10, wherein: the driving circuit includes at least two-row pins arranged along the first direction; and a plurality of first pins are in a same row; or a plurality of second pins are in a same row.

13. The touch display panel according to claim 1, wherein: the first type of pad group includes an even number of total pads, a centerline of the first type of pad group is located in a spacing between two adjacent central pads in the first type of pad group, and the centerline of the first type of pad group is located in the central region of the bonding region.

14. The touch display panel according to claim 1, wherein: the centerline of the first type of pad group is located between the two adjacent central pads that are different, and the different two adjacent central pads include a first pad and a second pad.

15. A touch display device, comprising: a touch display panel, including: a display region and a non-display region, wherein the display region includes a plurality of pixel electrodes and a plurality of touch control electrodes, and the non-display region includes a fan-out region and a bonding region used to bond a driving circuit, wherein: the bonding region includes pads, the pads including a plurality of first pads and a plurality of second pads, the plurality of first pads and the plurality of second pads contain first and second pads, arranged to form a first type of pad group, the plurality of first pads and the plurality of second pads further contain first and second pads, arranged to form a second type of pad group, the second type of pad group is different from the first type of pad group, the first type of pad group is disposed in a central region of the bonding region, and the same second type of pad group is disposed in an edge region on each side of the first type of pad group, a first pad of the plurality of first pads is electrically connected to one of signal output terminals of the driving circuit for providing a data signal to a pixel electrode of the plurality of pixel electrodes, a second pad of the plurality of second pads is electrically connected to one of signal input terminals of the driving circuit for one or more of receiving a touch control signal collected by the touch control electrodes and providing the touch control signal to the touch control electrodes, and the fan-out region includes a plurality of first trace wires electrically connected to the plurality of pixel electrodes as well as the plurality of first pads, and a plurality of second trace wires electrically connected to the plurality of touch control electrodes as well as the plurality of second pads, wherein: one of the first type of pad group and the second type of pad group includes: a first pad group including: one or more of a first repeating unit and a second repeating unit, wherein the first repeating unit includes at least one first pad and at least one second pad; and a second repeating unit includes at least one first pad and at least one second pad; and a ratio of a quantity of first pads over a quantity of second pads in the first repeating unit is 2:1 or 1:2, and a ratio of a quantity of first pads over a quantity of second pads in the second repeating units is 1:1.

\* \* \* \* \*